(12) United States Patent
Chen et al.

(10) Patent No.: US 12,477,397 B2
(45) Date of Patent: Nov. 18, 2025

(54) BASE STATION LOAD BALANCING SYSTEM AND METHOD

(71) Applicant: Compal Electronics, Inc., Taipei (TW)

(72) Inventors: Yong-Cheng Chen, Taipei (TW); Chun-Wei Chang, Taipei (TW); Tsung-Hsuan Tsai, Taipei (TW)

(73) Assignee: Compal Electronics, Inc., Taipei (TW)

( * ) Notice: Subject to any disclaimer, the term of this patent is extended or adjusted under 35 U.S.C. 154(b) by 409 days.

(21) Appl. No.: 18/126,936

(22) Filed: Mar. 27, 2023

(65) Prior Publication Data

US 2024/0224119 A1  Jul. 4, 2024

(30) Foreign Application Priority Data

Dec. 30, 2022 (TW) .................................. 111150908

(51) Int. Cl.
*H04W 28/08* (2023.01)
(52) U.S. Cl.
CPC ... *H04W 28/0958* (2020.05); *H04W 28/0925* (2020.05)
(58) Field of Classification Search
CPC ...................... H04W 28/0958; H04W 28/0925
See application file for complete search history.

(56) References Cited

U.S. PATENT DOCUMENTS

| | | | |
|---|---|---|---|
| 10,992,763 B2 | 4/2021 | Kursun et al. | |
| 11,038,763 B1 | 6/2021 | Cui et al. | |
| 11,044,616 B2 | 6/2021 | Chow | |
| 11,076,337 B2 | 7/2021 | Schwengler et al. | |
| 11,109,283 B1 | 8/2021 | Kulkarni et al. | |
| 11,178,574 B2 | 11/2021 | Byun et al. | |
| 2018/0012153 A1 | 1/2018 | Hu et al. | |
| 2020/0259896 A1 | 8/2020 | Sachs et al. | |
| 2020/0374374 A1 | 11/2020 | Deshpande | |
| 2022/0150785 A1 | 5/2022 | Wu et al. | |
| 2024/0178897 A1* | 5/2024 | Sangdeh | H04B 17/26 |
| 2025/0184823 A1* | 6/2025 | Filin | H04W 28/0942 |

FOREIGN PATENT DOCUMENTS

TW    I700649 B    8/2020

* cited by examiner

*Primary Examiner* — Jung H Park
(74) *Attorney, Agent, or Firm* — KIRTON McCONKIE; Evan R. Witt

(57) ABSTRACT

The present disclosure provides a base station load balancing system including a communication network, a performance evaluator and an algorithm switching device. The communication network includes a base station and a plurality of user devices. The performance evaluator is connected to the communication network and evaluates a loading performance of the communication network in a time period according to a first loading data of the communication network in the time period. The algorithm switching device is connected to the performance evaluator and selects the algorithm used by the communication network as a selected algorithm according to the loading performance. The communication network, with the selected algorithm, allocates the connection relation between the base station and plurality of user devices according to the first loading data. The selected algorithm is a machine learning algorithm or a rule-based algorithm.

14 Claims, 5 Drawing Sheets

BASE STATION LOAD BALANCING SYSTEM AND METHOD

CROSS-REFERENCE TO RELATED APPLICATION

This application claims priority to Taiwan Patent Application No. 111150908, filed on Dec. 30, 2022, the entire contents of which are incorporated herein by reference for all purposes.

FIELD OF THE INVENTION

The present disclosure relates to a base station load balancing system and method, and more particularly to a base station load balancing system and method capable of switching the algorithm used by the communication network.

BACKGROUND OF THE INVENTION

Conventionally, after the wireless network is built, the user devices in the environment are distributed in the service area of the wireless network. Since the distributed positions of the user devices are unpredictable, the data throughput required by the base station will be greater than the amount of transmitted data that the actual software and hardware can provide when the number of the user devices served by the base station exceeds a certain number. Therefore, the overload of the base station is caused, and the loading performance of the wireless network is reduced. Consequently, the load balancing of base station is an important issue in wireless network technology.

The conventional way to deal with the load balancing issue of base station is to allocate the connection relation between the base station and the user device by a rule-based algorithm. The rule-based algorithm has good loading performance under known or predictable communication environment. However, if the current communication environment changes a lot suddenly, such as the sudden increase of a large amount of people on the street in the actual environment, the rule-based algorithm cannot be adapted to cope with the current communication environment. Therefore, the loading performance of the wireless network is reduced.

Therefore, there is a need of providing a base station load balancing system and method to obviate the drawbacks encountered from the prior arts.

SUMMARY OF THE INVENTION

It is an object of the present disclosure to provide a base station load balancing system and method. The algorithm switching device selects the algorithm used by the communication network according to the loading performance of the communication network. Therefore, the algorithm used by the communication network can be changed according to the current communication environment. When the communication environment changes a lot suddenly and the use of the rule-based algorithm may cause the load of the base station imbalanced, the algorithm used by the communication network is switched to the machine learning algorithm. By allocating the connection relations between the base station and the plurality of user devices through the machine learning algorithm, the load of the base station is balanced without overloading, and the loading performance of the communication network is improved.

In accordance with an aspect of the present disclosure, there is provided a base station load balancing system, the base station load balancing system includes a communication network, a performance evaluator and an algorithm switching device. The communication network includes a base station and a plurality of user devices. The performance evaluator is connected to the communication network and evaluates a loading performance of the communication network in a time period according to a first loading data of the communication network in the time period. The algorithm switching device is connected to the performance evaluator and selects the algorithm used by the communication network as a selected algorithm according to the loading performance. The communication network, with the selected algorithm, allocates the connection relation between the base station and plurality of user devices according to the first loading data. The selected algorithm is a machine learning algorithm or a rule-based algorithm.

In accordance with an aspect of the present disclosure, there is provided a base station load balancing method. The base station load balancing method includes steps of: (a) providing a communication network, wherein the communication network includes a base station and a plurality of user devices; (b) evaluating a loading performance of the communication network in a time period according to a first loading data in the time period of the communication network by a performance evaluator; and (c) selecting an algorithm used by the communication network as a selected algorithm according to the loading performance by a algorithm switching device. The communication network allocates a connection relation between the base station and plurality of user devices with the selected algorithm according to the first loading data. The algorithm is a machine learning algorithm or a rule-based algorithm.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
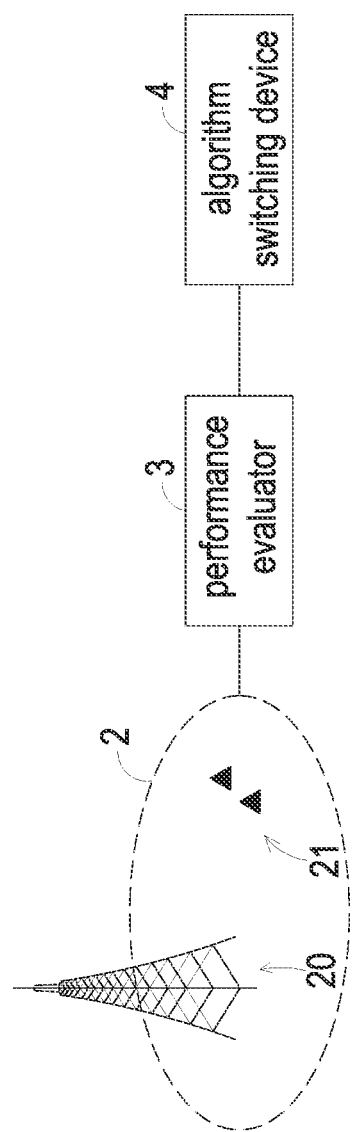
FIG. 1 is a schematic block diagram illustrating a base station load balancing system according to an embodiment of the present disclosure.

FIG. 1 is a schematic block diagram illustrating a base station load balancing system 1 according to an embodiment of the present disclosure. As shown in FIG. 1, the base station load balancing system 1 includes a communication network 2, a performance evaluator 3 and an algorithm switching device 4. The communication network 2 includes a base station 20 and a plurality of user devices 21. In an embodiment, the communication network 2 is formed by at least one of the radio access network (RAN) and the 5G core network. The user device 21 is for example but not limited to a terminal device or a mobile device. The performance evaluator 3 is connected to the communication network 2 and is configured to evaluate a loading performance of the communication network 2 in a time period according to a first loading data of the communication network 2 in the time period. In an embodiment, the loading performance includes at least one of the upload speed, the download speed and the throughput between the base station 20 and the plurality of user devices 21. The algorithm switching device 4 is connected to the performance evaluator 3 and selects the algorithm used by the communication network 2 as a selected algorithm according to the loading performance. The communication network 2, with the selected algorithm, allocates the connection relations between the base station 20 and plurality of user devices 21 according to the first loading data. The selected algorithm is a machine learning algorithm or a rule-based algorithm. The machine learning algorithm is for example but not limited to a reinforcement learning algorithm. In an embodiment, the base station load balancing system 1 utilizes the first loading data to train the machine learning algorithm. The first loading data is calculated as a handover parameter information through the rule-based algorithm, and the handover parameter information is labeled for the base station load balancing system 1 to train the machine learning algorithm. When the connection relation between the base station 20 and the user device 21 is connected, it represents that the base station 20 provides services to the user device 21, namely the base station 20 can communicate or transmit data with the user device 21. Conversely, when the connection relation between the base station 20 and the user device 21 is disconnected, it represents that the base station 20 cannot provide services to the user device 21, namely the base station 20 cannot communicate or transmit data with the user device 21. In addition, in an embodiment, the model trained by the machine learning algorithm is recorded in a cloud backup system (not shown).

In an embodiment, the communication network 2 includes a plurality of base stations, the change of the connection relation between the base station and the user device represents that the user device has been handed over to another base station. By reallocating the connection relations between the plurality of base stations and the plurality of user devices in the communication network 2, the loads of the base stations in the communication network 2 are balanced so that the base stations will not be overloaded. Therefore, the internet experience of the user device and the loading performance of the communication network 2 are improved.

In an embodiment, the base station load balancing system 1 further includes a first access device and a database connected to each other. The database is further connected to the performance evaluator 3 and the communication network 2. The first access device is configured for retrieving a first loading data of the communication network 2 within a specific time interval. It should be noted that the specific time interval may be adjusted according to actual needs, and the length of the specific time interval is for example but not limited to 3 hours, 6 hours, one day or one week. The first access device provides the loading data within the specific time interval to the performance evaluator 3 for evaluating the loading performance within the specific time interval. When the loading performance within the specific time interval is less than a specific value, the algorithm used by the communication network is switched to the rule-based algorithm.

In the base station load balancing system of the present disclosure, the algorithm switching device selects the algorithm used by the communication network according to the loading performance of the communication network. Therefore, the algorithm used by the communication network can be changed according to the current communication environment. When the communication environment changes a lot suddenly and the use of the rule-based algorithm may cause the load of the base station imbalanced, the algorithm used by the communication network is switched to the machine learning algorithm. By allocating the connection relation between the base station and the plurality of user devices through the machine learning algorithm, the load of the base station is balanced without overloading, and the loading performance of the communication network is improved.

The performance evaluator 3 and the algorithm switching device 4 are for example but not limited to a central processing unit (CPU), a micro processing unit (MPU) or a micro control unit (MCU).

The base station load balancing system is not limited to train the machine learning algorithm by the first loading data. In an embodiment, the base station load balancing system may also utilize the loading data generated by the simulated network to train the machine learning algorithm. The embodiment of the base station load balancing system utilizing a simulated network to generate loading data is exemplified in FIG. 2 as follows.

Figure 2:
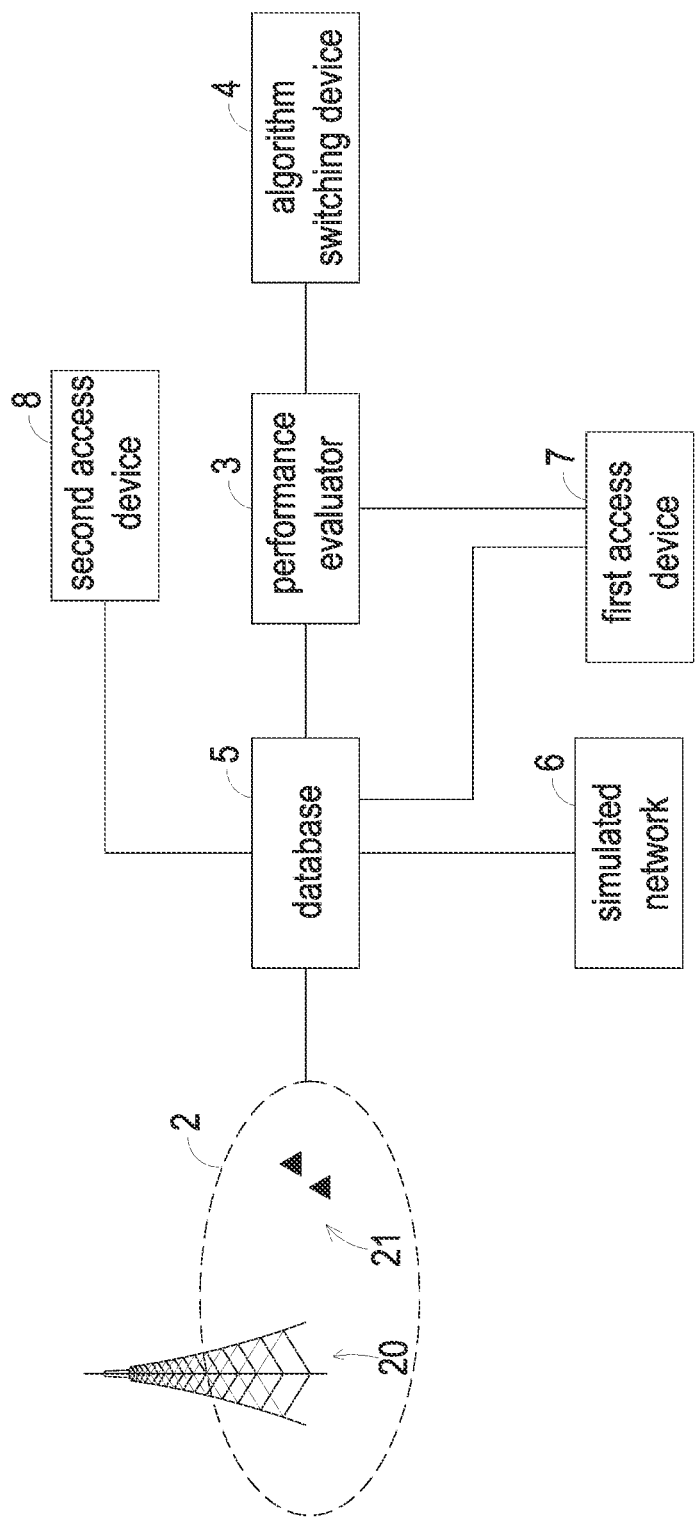
FIG. 2 is a schematic block diagram illustrating a base station load balancing system according to another embodiment of the present disclosure.

FIG. 2 is a schematic block diagram illustrating a base station load balancing system 1a according to another embodiment of the present disclosure. The elements of FIG. 2 similar with those of FIG. 1 are represented by the same reference numerals, and the detailed description thereof is omitted herein. Please refer to FIG. 2, the base station load balancing system 1a further includes a database 5, a simulated network 6, a first access device 7 and a second access device 8. In an embodiment, the performance evaluator 3, the algorithm switching device 4, the database 5, the first access device 7, the second access device 8 and the simulated network 6 may be components of a network management server. The simulated network 6 is configured for generating a second loading data. The simulated network 6 is for example but not limited to a communication network formed by a network simulator. The database 5 is connected to the communication network 2 and the simulated network 6 and is configured for storing a storage data, and the source of the storage data includes the first loading data and the second loading data. The second access device 8 is connected to the database 5 and is configured for retrieving the second loading data. The base station load balancing system 1a obtains the second loading data from the second access device 8 and trains the machine learning algorithm according to the storage data.

Figure 3:
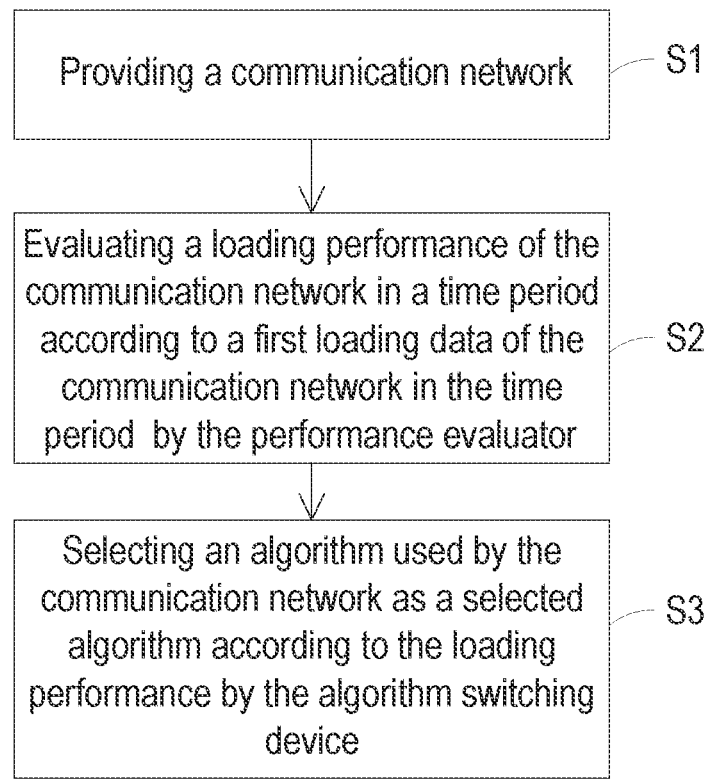
FIG. 3 is a schematic flow chart illustrating a base station load balancing method according to an embodiment of the present disclosure.

FIG. 3 is a schematic flow chart illustrating a base station load balancing method according to an embodiment of the present disclosure. The base station load balancing method of the present disclosure is applicable for the base station load balancing system 1 stated above. As shown in FIG. 3, the base station load balancing method includes steps S1, S2 and S3. In the step S1, a communication network 2 is provided. The communication network 2 includes a base station 20 and a plurality of user devices 21. In the step S2, a loading performance of the communication network 2 in a time period is evaluated according to a first loading data of the communication network 2 in the time period by the performance evaluator 3. The time period may be a preset unit time. In the step S3, an algorithm used by the communication network 2 is selected as a selected algorithm according to the loading performance by the algorithm switching device 4. The communication network 2 allocates the connection relation between the base station 20 and plurality of user devices 21 with the selected algorithm according to the first loading data. The algorithm is a machine learning algorithm or a rule-based algorithm.

Figure 4:
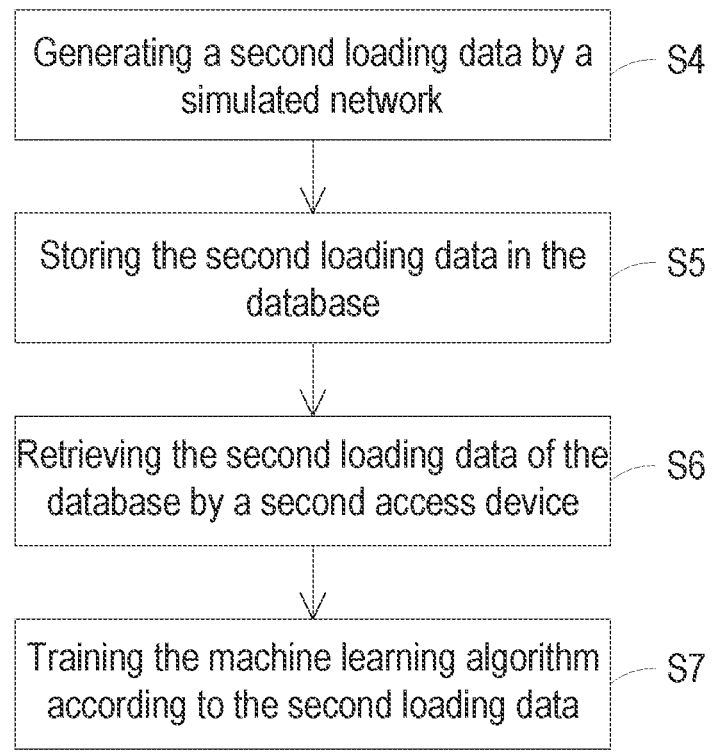
FIG. 4 is a schematic flow chart illustrating a machine learning algorithm training of a base station load balancing method according to an embodiment of the present disclosure.

FIG. 4 is a schematic flow chart illustrating a machine learning algorithm training of a base station load balancing method according to an embodiment of the present disclosure. The base station load balancing method of the present embodiment is applicable for the base station load balancing system 1 shown in FIGS. 1 and 2 and the base station load balancing method shown in FIG. 3. As shown in FIG. 4, the base station load balancing method further includes steps S4, S5, S6 and S7. In the step S4, a second loading data is generated by a simulated network 6. In the step S5, the second loading data is stored in a database 5. In the step S6, the second loading data of the database 5 is retrieved by a second access device 8. In the step S7, the machine learning algorithm is trained according to the second loading data.

Figure 5:
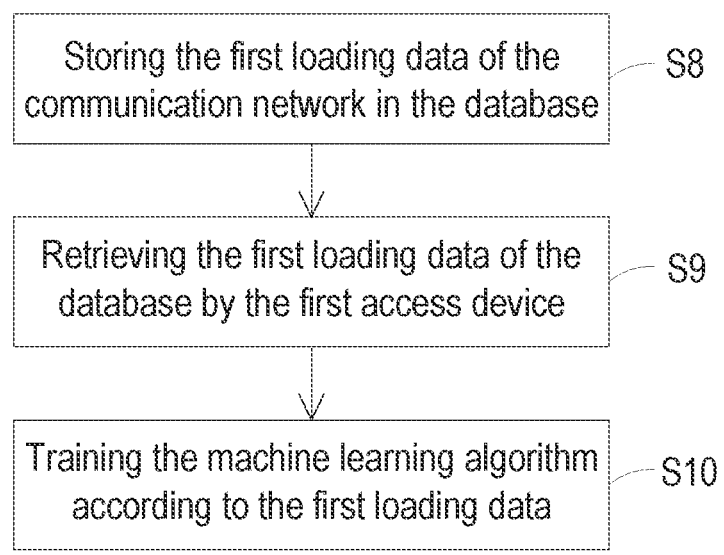
FIG. 5 is a schematic flow chart illustrating a machine learning algorithm training of a base station load balancing method according to another embodiment of the present disclosure.

FIG. 5 is a schematic flow chart illustrating a machine learning algorithm training of a base station load balancing method according to another embodiment of the present disclosure. The base station load balancing method of the present embodiment is applicable for the base station load balancing system 1 shown in FIGS. 1 and 2 and the base station load balancing method shown in FIG. 3. As shown in FIG. 5, the base station load balancing method further includes steps S8, S9, and S10. In the step S8, the first loading data of the communication network 2 is stored in the database 5 within a specific time interval. In the step S9, the first loading data of the database 5 within the specific time interval is retrieved by the first access device 7. In the step S10, the machine learning algorithm is trained according to the first loading data within the specific time interval.

From the above descriptions, the present disclosure provides a base station load balancing system and method, the algorithm switching device selects the algorithm used by the communication network according to the loading performance of the communication network. Therefore, the algorithm used by the communication network can be changed according to the current communication environment. When the communication environment changes a lot suddenly and the use of the rule-based algorithm may cause the load of the base station imbalanced, the algorithm used by the communication network is switched to the machine learning algorithm. By allocating the connection relation between the base station and the plurality of user devices through the machine learning algorithm, the load of the base station is balanced without overloading, and the loading performance of the communication network is improved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A base station load balancing system, comprising:
   a communication network, comprising a base station and a plurality of user devices;
   a performance evaluator connected to the communication network, wherein the performance evaluator evaluates a loading performance of the communication network in a time period according to a first loading data of the communication network in the time period; and
   an algorithm switching device connected to the performance evaluator, wherein the algorithm switching device selects an algorithm used by the communication network as a selected algorithm according to the loading performance;
   wherein the communication network, with the selected algorithm, allocates a connection relation between the base station and plurality of user devices according to the first loading data, and the selected algorithm is a machine learning algorithm or a rule-based algorithm,
   wherein the base station load balancing system further comprises:
   a simulated network configured for generating a second loading data;
   a database connected to the communication network and the simulated network, and configured for storing a storage data, wherein the storage data comprises the first loading data and the second loading data; and
   a second access device connected to the database and configured for retrieving the second loading data,
   wherein the base station load balancing system obtains the second loading data from the second access device and trains the machine learning algorithm according to the storage data.

2. The base station load balancing system according to claim 1, further comprising a first access device connected to the database, wherein the first access device is configured for retrieving the first loading data within a specific time interval.

3. The base station load balancing system according to claim 2, wherein the first access device provides the loading data within the specific time interval to the performance evaluator for evaluating the loading performance within the specific time interval, wherein when the loading performance within the specific time interval is less than a specific value, the algorithm used by the communication network is switched to the rule-based algorithm.

4. The base station load balancing system according to claim 1, wherein the base station load balancing system utilizes the first loading data to train the machine learning algorithm.

5. The base station load balancing system according to claim 4, wherein the first loading data is calculated as a handover parameter information through the rule-based algorithm, and the handover parameter information is labeled for the base station load balancing system to train the machine learning algorithm.

6. The base station load balancing system according to claim 1, wherein a model trained by the machine learning algorithm is recorded in a cloud backup system.

7. The base station load balancing system according to claim 1, wherein the communication network is formed by at least one of the radio access network (RAN) and the 5G core network.

8. The base station load balancing system according to claim 1, wherein the loading performance comprises at least one of the upload speed, the download speed and the throughput between the base station and the plurality of user devices.

9. A base station load balancing method comprising steps of:
   (a) providing a communication network comprising a base station and a plurality of user devices;
   (b) evaluating a loading performance of the communication network in a time period according to a first loading data of the communication network in the time period by a performance evaluator; and
   (c) selecting an algorithm used by the communication network as a selected algorithm according to the loading performance by an algorithm switching device,
   wherein the communication network allocates a connection relation between the base station and plurality of user devices with the selected algorithm according to the first loading data, and the algorithm is a machine learning algorithm or a rule-based algorithm,
   wherein the base station load balancing method further comprises steps of:
   (d) generating a second loading data by a simulated network,
   (e) storing the second loading data in a database;
   (f) retrieving the second loading data of the database by a second access device; and
   (e) training the machine learning algorithm according to the second loading data.

10. The base station load balancing method according to claim 9, further comprising steps of:
   (h) storing the first loading data of the communication network in the database within a specific time interval;
   (i) retrieving the first loading data of the database within the specific time interval by a first access device; and
   (j) training the machine learning algorithm according to the first loading data within the specific time interval.

11. The base station load balancing method according to claim 10, wherein the first loading data is calculated as a handover parameter information through the rule-based algorithm, and the handover parameter information is labeled for the base station load balancing system to train the machine learning algorithm.

12. The base station load balancing method according to claim 9, wherein a model trained by the machine learning algorithm is recorded in a cloud backup system.

13. The base station load balancing method according to claim 9, wherein the communication network is formed by at least one of the radio access network (RAN) and the 5G core network.

14. The base station load balancing method according to claim 9, wherein the loading performance comprises at least one of the upload speed, the download speed and the throughput between the base station and the plurality of user devices.

\* \* \* \* \*